UNITED STATES PATENT OFFICE.

CARL MARTIUS, OF BERLIN, GERMANY.

PROCESS OF PRODUCING A BASIC COLORING-MATTER FROM XYLIDINE.

SPECIFICATION forming part of Reissued Letters Patent No. 10,353, dated July 10, 1883.

Original No. 268,113, dated November 28, 1882. Application for reissue filed June 9, 1883.

*To all whom it may concern:*

Be it known that I, CARL MARTIUS, of the city of Berlin, of the Kingdom of Prussia, Germany, have invented a new and useful Process for Producing a Basis for Coloring-Matter; and I do hereby declare the same and the mode of making it to be described in the following specification.

In carrying out my invention I, in a closed digester, heat to 280° centigrade hydrochlorate of xylidine with a quantity of methylic alcohol. The crude hydrochlorate of cumidine obtained in that way I convert into the nitrate, which, being soluble with difficulty, I separate from the mother-liquors by means of a centrifuge, and wash with water. A fine crystalline powder of nitrate of cumidine is thus obtained. This nitrate is next to be converted into the base and subjected to fractional distillation. The parts boiling between 225° and 245° centigrade crystallize on cooling. The crystals are next to be separated from the non-crystallizable mother-liquors by means of a centrifuge or a press.

The crystallized cumidine thus obtained has a constant boiling-point of 235° to 236° centigrade, and melts at 62° centigrade, and can be advantageously used in the manufacture of azo colors. It is especially valuable, as its diazo compounds give, with the disulpho-acid of beta-naphthol, colors which are considerably superior in redness to similar products at present on the market. Another orange-red color is obtained by the combination of the diazo compound of the crystallized cumidine with the monosulpho-acids of beta-naphthol.

This cumidine is easily converted into a sulpho-acid by means of sulphuric acid, according to the process already well known in manufacturing sulphonilic acid. The diazo compound of the sulpho-acid of the cumidine likewise produces colors with naphthol.

I claim as my invention as follows:

The process, substantially as described, for producing the new basis for obtaining coloring-matter—viz., crystallized cumidine—such consisting in treating with methylic alcohol in a digester hydrochlorate of xylidine, converting the crude hydrochlorate of cumidine obtained in that way into the nitrate, and by a centrifuge, or other suitable means, separating the resulting nitrate from the mother-liquors, washing it, and subsequently converting it into the base and subjecting it to fractional distillation, and crystallizing the distillate and separating the crystals from the mother-liquors by a centrifuge or other suitable means, all being essentially as explained.

CARL MARTIUS.

Witnesses:

B. ROI,

ALBRECHT SCHUBART.